US008183326B2

(12) United States Patent
Yan et al.

(10) Patent No.: US 8,183,326 B2
(45) Date of Patent: May 22, 2012

(54) FUNCTIONALIZED POLYMER

(75) Inventors: Yuan-Yong Yan, Copley, OH (US);
Dennis R. Brumbaugh, North Canton, OH (US); Steven Luo, Copley, OH (US)

(73) Assignee: Bridgestone Corporation, Tokyo (JP)

( * ) Notice: Subject to any disclaimer, the term of this patent is extended or adjusted under 35 U.S.C. 154(b) by 602 days.

(21) Appl. No.: 11/880,733

(22) Filed: Jul. 24, 2007

(65) Prior Publication Data

US 2008/0027171 A1  Jan. 31, 2008

Related U.S. Application Data

(60) Provisional application No. 60/833,228, filed on Jul. 25, 2006.

(51) Int. Cl.
*C08F 4/52* (2006.01)
*C08F 136/06* (2006.01)
*C08F 236/06* (2006.01)

(52) U.S. Cl. ............... 525/331.9; 525/332.8; 525/333.2; 525/351; 525/374; 525/375; 525/385; 526/192; 526/335

(58) Field of Classification Search ............... 525/331.9, 525/332.8, 333.2, 351, 375, 385; 526/192, 526/335
See application file for complete search history.

(56) References Cited

U.S. PATENT DOCUMENTS

| | | | |
|---|---|---|---|
| 4,647,625 A | | 3/1987 | Aonuma et al. |
| 4,791,174 A | * | 12/1988 | Bronstert et al. ............. 525/274 |
| 4,816,520 A | | 3/1989 | Bronstert |
| 5,310,798 A | * | 5/1994 | Lawson et al. ................ 525/102 |
| 5,844,050 A | | 12/1998 | Fukahori et al. |
| 5,902,856 A | * | 5/1999 | Suzuki et al. .................. 525/237 |
| 6,977,281 B1 | * | 12/2005 | Ozawa et al. .................. 525/377 |
| 7,879,952 B2 | * | 2/2011 | Luo et al. ..................... 525/331.9 |
| 2003/0114612 A1 | | 6/2003 | Grun et al. .................... 526/204 |
| 2007/0149717 A1 | * | 6/2007 | Luo et al. ..................... 525/331.9 |
| 2008/0027171 A1 | * | 1/2008 | Yan et al. ....................... 524/612 |
| 2008/0103252 A1 | | 5/2008 | Brumbaugh et al. |

FOREIGN PATENT DOCUMENTS

| | | | |
|---|---|---|---|
| EP | 0863165 | * | 9/1998 |
| WO | WO 01/34659 | * | 5/2001 |

OTHER PUBLICATIONS

Carlotti (Polymer 46 (2005) 6836-6843).*
S. Rádl, "Crisscross Cycloaddition Reactions," *Aldrichimica Acta*, 1997, vol. 30(3), pp. 97-100 (Sigma-Aldrich Co.; St. Louis, Missouri, USA).
R. Cohen et al., "Novel Azine Reactivity: Facile N-N Bond Cleavage, C-H Activation, and N-N Coupling Mediated by Rh$^I$,"*Angew Chem. Int. Ed.*, 2003, vol. 42, pp. 1949-1952 (Wiley-VCH Verlag GmbH & Co. KGaA; Weinheim, Germany).
D.D. Choytun et al., "Azines possessing strong push-pull donors/acceptors," *Chem. Commun.*, 2004, pp. 1842-1843 (The Royal Society of Chemistry; Great Britain).
M.Y. Khuhawar et al., "Syntheses and Thermoanalytical Studies of Some Schiff Base Polymers Derived from 5,5'-methylene Bis(2-Hydroxyacetophenone)," *Eur. Polym. J.*, 1998, vol. 34, No. 1, pp. 133-135 (Elsevier Science Ltd.; Great Britain).
J. Čermák et al., "Diphosphinoazines (Z,Z)-$R_2PCH_2C(Bu^1)=NN=C(Bu1)CH_2PR_2$ with R groups of various sizes and complexes $\{[(Z,Z)-R_2PCH_2C(Bu^1)=NN=C(Bu^1)CH_2PR_2][\eta^3-CH_2C(CH_3)=CH_2PdCl]_2\}$," *Inorganica Chemica Acta*, 2001, vol. 313, No. 77-86 (Elsevier Science B.V., Netherlands).
M.F.N. N. Carvalho et al., "Activation of a coordinated alkyne by electron transfer: . . . ," *Journal of Organometallic Chemistry*, 2000, vol. 598, pp. 318-328 (Elsevier Science S.A.; Netherlands).
A. Singh et al., "Arene ruthenium complexes incorporating immine/azine hybrid-chelating N-N' donor ligands: synthetic, spectral, structural aspects and DFT studies," *Journal of Organometallic Chemistry*, 2004, vol. 689, pp. 1821-1834 (Elsevier B.V.; Netherlands).
M. Chandra et al., "Potential inhibitors of DNA topoisomerase II: ruthenium(II) poly-pyridyl and pyridyl-azine complexes," *Journal of Organometallic Chemistry*, 2004, vol. 689, pp. 2256-2267 (Elsevier B.V.; Netherlands).
S.K. Singh et al., "Helices of ruthenium complexes involving pryidyl-azine ligands: synthesis, spectral, and structural aspects," *Journal of Organometallic Chemistry*, 2004, vol. 689, pp. 3612-3620 (Elsevier B.V.; Netherlands).
D.A. Edwards et al., "Some aspects of the coordination chemistry of 2-pyridinecarbaldehyde azine, (2-paa) . . . ," *Polyhedron*, 1998, vol. 17, Nos. 13-14, pp. 2321-2326 (Elsevier Science Ltd.; Great Britain).
J. Granifo et at "Synthesis and characterization of polynuclear complexes of molybdenum carbonyl derivatives with pyridine-2-carbaldehyde azine (pa) and ferrocenylphosphines . . . ," *Polyhedron*, 1998, vol. 17, No. 10, pp. 1729-1733 (Elsevier Science Ltd.; Great Britain).
H-Y Noh et al., "Addition reactions to chiral aziridine-2-carboxaldimine toward various enantiopure nitrogen-containing heterocycles," *Tetrahedron*, 2005, vol. 61, pp. 9281-9290 (Elsevier Ltd.; Great Britain).
Y-G Lim et al., "Rhodium-catalyzed alkylation of aromatic azines with alkenes via C-H bond activation," *Tetrahedron Letters*, 2005, vol. 46, pp. 385-388 (Elsevier Ltd.; Great Britain).
O. Nuyken et al., "Azo polymers—synthesis and reactions, 3," *Makromol. Chem.*, 1989, vol. 190, pp. 469-475 (Wiley-VCH Verlag GmbH; Wernheim, Germany).

(Continued)

*Primary Examiner* — Mark Eashoo
*Assistant Examiner* — Michael A Salvitti
(74) *Attorney, Agent, or Firm* — Meredith E. Hooker; David G. Burleson

(57) ABSTRACT

A polymer includes directly bonded aromatic pendent groups and at least one moiety defined by one of the following formulas

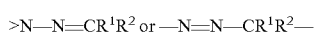

where $R^1$ and $R^2$ (a) are independently H or a substituted or unsubstituted alkyl, alkenyl, cycloalkyl, cycloalkenyl, aryl, allyl, aralkyl, alkaryl, or alkynyl group, or (b) together form a substituted or unsubstituted alkylene, alkenylene, cycloalkylene, cycloalkenylene, or arylene group. The moiety can be attached to the polymer through one or both of the two open bonds and, where it is attached through only one bond, the other bond attaches to a hydrogen atom, i.e., the moiety is at a terminus of the polymer. Such polymers can be used to provide compositions that also include particulate fillers.

19 Claims, No Drawings

OTHER PUBLICATIONS

D. Enders et al., "Enantioselective Synthesis of α-Substituted Primary Amines by Nucleophilic Addition to Aldehyde-SAMP Hydrazones," *Angew. Chem. Int. Ed. Engl.*, 1986, vol. 25, No. 12, pp. 1109-1110 (VCH Verlagsgesellschaft mbH; Wernheim, Germany).

A. Harada et al., "Polymerization of Azabutadiene (Azine) Derivatives. Preparation of a Stereoregular Polymer from Prionaldehyde Azine," *Macromolecules*, 1991, vol. 24, pp. 5504-5507 (American Chemical Society; Washington, DC).

D. Enders et al., "Asymmetric synthesis of amines by nucleophilic 1,2-addition of organometallic reagents to the CN-double bond," *Tetrahedron: Asymmetry*, 1997, vol. 9, No. 12, pp. 1895-1946 (Elsevier Science Ltd.; Great Britain).

A. Hashidzume et al., "Preparation and Polymerization of Benzaldehyde Formaldehyde Azine (1-Phenyl-2,3-diaza-1,2-butadiene)," *Macromolecules*, 2000, vol. 33, pp. 2397-2402 (American Chemical Society; Washington, DC).

G.K. Friestad, "Chiral N-Acylhydrazones: Versatile Imino Acceptors for Axymmetric Amine Synthesis," *Eur. J. Org. Chem.*, 2005, pp. 3157-3172 (Wiley-VCH Verlag GmbH & Co. KGaA; Wernheim, Germany).

\* cited by examiner

FUNCTIONALIZED POLYMER

CROSS-REFERENCE TO RELATED APPLICATION

This application claims the benefit of U.S. provisional patent application No. 60/833,228, filed 25 Jul. 2006, the entirety of which is incorporated herein by reference.

BACKGROUND INFORMATION

Rubber goods such as tire treads often are made from elastomeric compositions that contain one or more reinforcing materials such as, for example, particulate carbon black and silica; see, e.g., *The Vanderbilt Rubber Handbook*, 13th ed. (1990), pp. 603-04.

Good traction and resistance to abrasion are primary considerations for tire treads; however, motor vehicle fuel efficiency concerns argue for a minimization in their rolling resistance, which correlates with a reduction in hysteresis and heat build-up during operation of the tire. These considerations are, to a great extent, competing and somewhat contradictory: treads made from compositions designed to provide good road traction usually exhibit increased rolling resistance and vice versa.

Filler(s), polymer(s), and additives typically are chosen so as to provide an acceptable compromise or balance of these properties. Ensuring that reinforcing filler(s) are well dispersed throughout the elastomeric material(s) both enhances processability and acts to improve physical properties. Dispersion of fillers can be improved by increasing their interaction with the elastomer(s). Examples of efforts of this type include high temperature mixing in the presence of selectively reactive promoters, surface oxidation of compounding materials, surface grafting, and chemically modifying the polymer, typically at a terminus thereof.

Various elastomeric materials often are used in the manufacture of vulcanizates such as, e.g., tire components. In addition to natural rubber, some of the most commonly employed include high-cis polybutadiene, often made by processes employing catalysts, and substantially random styrene/butadiene interpolymers, often made by processes employing anionic initiators. Functionalities that can be incorporated into high-cis polybutadiene often cannot be incorporated into anionically initiated styrene/butadiene interpolymers and vice versa.

SUMMARY

In one aspect is provided a polymer that includes directly bonded aromatic pendent groups and an azine radical. The azine radical can be located at a terminus of the polymer and/or can constitute one or more mer units in the polymer chain.

In another aspect is provided a polymer that includes directly bonded aromatic pendent groups and a moiety defined by one of the following formulas:

where $R^1$ and $R^2$ (a) are independently H or a substituted or unsubstituted alkyl, alkenyl, cycloalkyl, cycloalkenyl, aryl, allyl, aralkyl, alkaryl, or alkynyl group; or (b) together form a substituted or unsubstituted alkylene, alkenylene, cycloalkylene, cycloalkenylene, or arylene group. Where the moiety is attached to the polymer through only one of the two open bonds, the other bond attaches to a hydrogen atom, i.e., the moiety is a terminal moiety. (In the case of formula (II), bonding to the polymer occurs through the N atom, meaning that the hydrogen atom is bonded to the C atom.) Where the moiety defined by formula (I) is attached to the polymer through both of the open bonds, the resulting pendent group has the general formula

where $R^1$ and $R^2$ are defined as above with the proviso that both $R^1$ and $R^2$ are not H.

Polymers that include directly bonded aromatic groups and at least one additional pendent group of formula (III) also constitute an aspect of the invention.

In another aspect is provided a polymer that includes vinyl aromatic and azine mer units. In certain embodiments, the polymer can be provided by reacting a living polymer, specifically, one that includes vinyl aromatic mer, with an azine compound.

In each of the foregoing, the polymer preferably includes polyene mer units. In certain embodiments, the polyenes can be conjugated dienes, and the resulting conjugated diene mer can incorporated substantially randomly along the polymer chain.

In each aspect, the polymer can be substantially linear. In certain embodiments, the substantially linear polymer can include an azine radical as a terminal moiety or a portion thereof.

Additionally or alternatively, the polymer can interact with particulate filler such as, e.g., carbon black. Compositions, including vulcanizates, that include particulate fillers and such polymers also are provided, as are methods of providing and using such compositions.

Methods of providing the polymer, regardless of how characterized, also are provided.

Other aspects of the present invention will be apparent to the ordinarily skilled artisan from the detailed description that follows.

To assist in understanding that description, certain definitions are provided immediately below, and these are intended to apply throughout unless the surrounding text explicitly indicates a contrary intention:

"polymer" means the polymerization product of one or more monomers and is inclusive of homo-, co-, ter-, tetra-polymers, etc.;

"mer" or "mer unit" means that portion of a polymer derived from a single reactant molecule (e.g., ethylene mer has the general formula —CH$_2$CH$_2$—);

"copolymer" means a polymer that includes mer units derived from two reactants, typically monomers, and is inclusive of random, block, segmented, graft, etc., copolymers;

"interpolymer" means a polymer that includes mer units derived from at least two reactants, typically monomers, and is inclusive of copolymers, terpolymers, tetra-polymers, and the like;

"substituted" means one containing a heteroatom or functionality (e.g., hydrocarbyl group) that does not interfere with the intended purpose of the group in question;

"directly bonded" means covalently attached with no intervening atoms or groups;

"polyene" means a molecule with at least two double bonds located in the longest portion or chain thereof, and specifically is inclusive of dienes, trienes, and the like;

"radical" means the portion of a molecule that remains after reacting with another molecule, regardless of whether any atoms are gained or lost as a result of the reaction;

"terminus" means an end of a polymeric chain; and

"terminal moiety" means a group or functionality located at a terminus.

Throughout this document, all values given in the form of percentages are weight percentages unless the surrounding text explicitly indicates a contrary intention. The relevant teachings of all patents mentioned below are incorporated herein by reference.

DETAILED DESCRIPTION

As apparent from the Summary section, the polymer can be described or characterized in a variety of ways. Generally, it includes directly bonded aromatic groups and a moiety defined by one of formula (I) or formula (II). Where the moiety defined by formula (I) is attached to the polymer through both of the open bonds, the resulting pendent group can be defined by formula (III).

In certain embodiments, the polymer can be provided by reacting an azine compound with a living polymer that includes vinyl aromatic mer units and, optionally, diene mer units, particularly conjugated diene mer.

The polymer can be elastomeric and can include mer units that include unsaturation such as those derived from polyenes, particularly dienes and trienes (e.g., myrcene). Illustrative polyenes include $C_4$-$C_{12}$ dienes, particularly conjugated dienes such as, but not limited to, 1,3-butadiene, isoprene, 1,3-pentadiene, 2,3-dimethyl-1,3-butadiene, and 1,3-hexadiene.

Polyenes can incorporate into polymeric chains in more than one way. Especially for tire tread applications, controlling this manner of incorporation can be desirable. A polymer chain with an overall 1,2-microstructure, given as a numerical percentage based on total polyene content, of from about 10 to about 80%, optionally from about 25 to 65%, can be desirable for certain end use applications. A polymer that has an overall 1,2-microstructure of no more than about 50%, preferably no more than about 45%, more preferably no more than about 40%, even more preferably no more than about 35%, and most preferably no more than about 30%, based on total polyene content, is considered to be "substantially linear".

Directly bonded pendent aromatic groups can be provided through incorporation of mer units derived from vinyl aromatics, particularly the $C_8$-$C_{20}$ vinyl aromatics such as, e.g., styrene, α-methyl styrene, p-methyl styrene, the vinyl toluenes, and the vinyl naphthalenes. When used in conjunction with one or more polyenes, mer units with pendent aromaticity can constitute from about 1 to about 50%, from about 10 to about 45%, or from about 20 to about 35%, of the polymer chain; the microstructure of such interpolymers can be random, i.e., the mer units derived from each type of constituent monomer do not form blocks and, instead, are incorporated in a non-repeating, essentially simultaneous manner. Random microstructure can provide particular benefit in some end use applications such as, e.g., rubber compositions used in the manufacture of tire treads.

Exemplary elastomers include interpolymers of one or more polyenes and styrene such as, e.g., poly(styrene-co-butadiene), also known as SBR.

The number average molecular weight ($M_n$) of the polymer typically is such that a quenched sample exhibits a gum Mooney viscosity ($ML_4$/100° C.) of from ~2 to ~150, more commonly from ~2.5 to ~125, even more commonly from ~5 to ~100, and most commonly from ~10 to ~75.

Elastomers can be made by emulsion polymerization or solution polymerization, with the latter affording greater control with respect to such properties as randomness, microstructure, etc. Solution polymerizations have been performed since about the mid-20th century, so the general aspects thereof are known to the ordinarily skilled artisan; nevertheless, certain aspects are provided here for convenience of reference.

Solution polymerization typically involves an initiator such as an organolithium compound, particularly alkyl-lithium compounds. Examples of organolithium initiators include N-lithio-hexamethyleneimine; n-butyllithium; tributyltin lithium; dialkylaminolithium compounds such as dimethylaminolithium, diethylaminolithium, dipropylaminolithium, dibutylaminolithium and the like; dialkylaminoalkyllithium compounds such as diethylaminopropyllithium; and those trialkyl stanyl lithium compounds involving $C_1$-$C_{12}$, preferably $C_1$-$C_4$, alkyl groups.

Multifunctional initiators, i.e., initiators capable of forming polymers with more than one living end, also can be used. Examples of multifunctional initiators include, but are not limited to, 1,4-dilithiobutane, 1,10-dilithiodecane, 1,20-dilithioeicosane, 1,4-dilithiobenzene, 1,4-dilithionaphthalene, 1,10-dilithioanthracene, 1,2-dilithio-1,2-diphenylethane, 1,3,5-trilithio-pentane, 1,5,15-trilithioeicosane, 1,3,5-trilithiocyclohexane, 1,3,5,8-tetralithiodecane, 1,5,10,20-tetralithioeicosane, 1,2,4,6-tetralithiocyclohexane, and 4,4'-dilithiobiphenyl.

In addition to organolithium initiators, so-called functionalized initiators also can be useful. These become incorporated into the polymer chain, thus providing a functional group at the initiated end of the chain. Examples of such materials include lithiated aryl thioacetals (see, e.g., U.S. Pat. No. 7,153,919) and the reaction products of organolithium compounds and, for example, N-containing organic compounds such as substituted aldimines, ketimines, secondary amines, etc., optionally pre-reacted with a compound such as diisopropenyl benzene (see, e.g., U.S. Pat. Nos. 5,153,159 and 5,567,815).

Useful anionic polymerization solvents include various $C_5$-$C_{12}$ cyclic and acyclic alkanes as well as their alkylated derivatives, certain liquid aromatic compounds, and mixtures thereof. The ordinarily skilled artisan is aware of other useful solvent options and combinations.

In solution polymerizations, both randomization and vinyl content (i.e., 1,2-microstructure) can be increased through inclusion of a coordinator, usually a polar compound, in the polymerization ingredients. Up to 90 or more equivalents of coordinator can be used per equivalent of initiator, with the amount depending on, e.g., the amount of vinyl content desired, the level of non-polyene monomer employed, the reaction temperature, and nature of the specific coordinator employed. Compounds useful as coordinators include organic compounds that include a heteroatom having a non-bonded pair of electrons (e.g., O or N). Examples include dialkyl ethers of mono- and oligo-alkylene glycols; crown ethers; tertiary amines such as tetra-methylethylene diamine; THF; THF oligomers; linear and cyclic oligomeric oxolanyl alkanes (see, e.g., U.S. Pat. No. 4,429,091) such as 2,2'-di(tetrahydrofuryl)propane, di-piperidyl ethane, hexamethylphosphoramide, N,N'-dimethylpiperazine, diazabicyclooctane, diethyl ether, tributylamine, and the like.

Although the ordinarily skilled artisan understands the conditions typically employed in solution polymerization, a representative description is provided for the convenience of the reader. The following is based on a batch process, although extending this description to, e.g., semi-batch or continuous processes is within the capability of the ordinarily skilled artisan.

Solution polymerization typically begins by charging a blend of monomer(s) and solvent to a suitable reaction vessel, followed by addition of a coordinator (if used) and initiator, which often are added as part of a solution or blend; alternatively, monomer(s) and coordinator can be added to the initiator. The procedure typically is carried out under anhydrous, anaerobic conditions. The reactants can be heated to a temperature of up to about 150° C. and agitated. After a desired degree of conversion has been reached, the heat source (if used) can be removed and, if the reaction vessel is to be reserved solely for polymerizations, the reaction mixture is removed to a post-polymerization vessel for functionalization and/or quenching. At this point, the reaction mixture commonly is referred to as a "polymer cement" because of its relatively high concentration of polymer.

As mentioned above, the polymer includes a moiety defined by one of formula (I) or formula (II). A convenient manner of providing such groups to the polymer is through introduction of and reaction with one or more azines.

Azines typically are formed by condensing hydrazine with an aldehyde, a ketone or both, typically in a molar ratio of 1:2. For example, hydrazine (x mol) can be reacted an aldehyde (2x mol) such as, e.g., cyclohexanecarboxaldehyde, in a suitable solvent; moderate temperatures on the order of 20'-25° C. typically are sufficient to allow for fairly complete reaction within a reasonable amount of time (e.g., less than a day). Isolation and purification of the azine can be accomplished by standard procedures such as vacuum distillation, drying, column chromatography, etc.

Where hydrazine is reacted with a single type of aldehyde, the resultant product can have alkyl groups positioned either cis or trans to the lone pair of electrons on each N atom. Isomers in which each set of alkyl groups is cis to the proximate electron pair (i.e., trans,trans-isomers) are most stable from a thermodynamic perspective; hence, for example, reacting two moles of benzaldehyde with hydrazine typically results in trans,trans-benzaldehyde azine. Nevertheless, kinetic factors can result in the formation of cis,cis-, trans,cis- or cis,trans-isomers or even a mixture of various isomers.

Exemplary azine compounds include those defined by the general formula

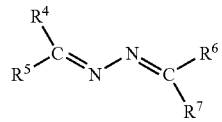

where each of $R^4$, $R^5$, $R^6$, and $R^7$ independently is H or a monovalent organic group which may include unsubstituted or substituted hydrocarbyl groups such as, but not limited to, alkyl, cyclo-alkyl, alkenyl, cycloalkenyl, aryl, allyl, substituted aryl, aralkyl, alkaryl, and alkynyl groups, with each group preferably containing up to 20 carbon atoms. These hydrocarbyl groups may contain heteroatoms such as, but not limited to, N, B, O, Si, S, and P atoms. One or more of $R^4$, $R^5$, $R^6$, and $R^7$ can include a heterocyclic substituent.

Other exemplary azine compounds include those defined by the formula

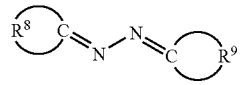

where $R^8$ and $R^9$ independently are divalent organic groups which can include substituted or unsubstituted hydrocarbylene group such as, but not limited to, alkylene, alkenylene, cyclo-alkylene, cycloalkenylene, and arylene groups, with each preferably containing no more than about 20 carbon atoms. Substituted hydrocarbylene groups include those in which one or more hydrogen atoms have been replaced by, e.g., an alkyl group. The divalent organic groups may also contain one or more heteroatoms such as, but not limited to, N, B, O, Si, S, and P atoms. $R^8$ and/or $R^9$ can be heterocyclic.

Exemplary azines also include those defined by the formula

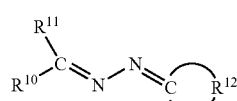

where $R^{10}$ and $R^{11}$ independently are defined as $R^4$-$R^7$ and $R^{12}$ is defined as $R^8$-$R^9$.

The following table (where "Az" represents "azine") provides a non-exhaustive list of exemplary azines that fall within one of the preceding formulas.

TABLE 1

| Exemplary azines | |
|---|---|
| aldehyde azines | formaldehyde Az, acetaldehyde Az, propanal Az, butanal Az, pentanal Az, cyclopentanecarboxaldehyde Az, hexanal Az, cyclohexanecarboxaldehyde Az, heptanal Az, cycloheptanecarboxaldehyde Az, octanal Az, cyclooctanecarboxaldehyde Az, benzaldehyde Az |
| mixed aldehyde azines | benzaldehyde propanal Az, cyclopentanecarboxaldehyde butanal Az, acetaldehyde propanal Az, cyclohexanecarboxaldehyde octanal Az, cyclononanecarboxaldehyde heptanal Az |
| aldehyde azines that include heterocyclic ring(s) | 2-pyridinecarboxaldehyde Az, tetrahydrofuran-3-carboxaldehyde Az, 3-furancarboxaldehyde Az, N-methyl-4-pyrazolecarboxaldehyde Az, N-methyl-2-pyrrolecarboxaldehyde Az, N-methyl-2-imidazolecarboxaldehyde Az, N-methyl-indole-3-carboxaldehyde Az, N-methyl-1,2,3-triazole-4-carboxaldehyde Az, N-methyl-1,2,4-triazole-3-carboxaldehyde |

TABLE 1-continued

Exemplary azines

| | |
|---|---|
| | Az, 2-furancarboxaldehyde Az, pyrazinecarboxaldehyde Az, 2-thiazole-carboxaldehyde Az, 2-thiophenecarboxaldehyde Az |
| ketone azines | acetone Az, propanone Az, butanone Az, petanone Az, hexanone Az, heptanone Az, octanone Az, nonanone Az |
| cyclic ketone azines | cyclobutanone Az, cyclopentanone Az, cyclohexanone Az, cycloheptanone Az, cyclooctanone Az, cyclononanone Az, cyclodecanone Az, cycloundecanone Az, cyclododecanone Az, cyclotridecanone azine. |
| mixed ketone azines | acetone propanone Az, acetone pentanone Az, propanone pentanone Az, hexanone octanone Az, butanone nonanone Az |
| ketone azines that include heterocyclic ring(s) | 2-acetylthiazole Az, 2-acetylpyridine Az, 3-acetylpyridine Az, 4-acetylpyridine Az, bis(2-pyridyl)ketone Az, 2-acetyl-1-methylpyrrole Az, 3-acetyl-1-methylpyrrole Az |
| mixed aldehyde-ketone azines | acetaldehyde pentanone Az, propanal hexanone Az, acetaldehyde butanone Az |

Because azines are structurally similar to conjugated dienes, azine mer can be incorporated during polymerization. Azines with relatively small substituents on both sides of the central N—N bond typically undergo trans-1,4-addition, i.e., are incorporated into a polymer chain such that the remaining unsaturation is located in or along the chain and between the two N atoms. Conversely, azines with a relatively bulky substituent on at least one side of the central N—N bond typically undergo 1,2-addition, i.e., are incorporated into a polymer chain such that the remaining unsaturation is located in a pendent group between N and C atoms. Depending on the functionalities included in the azine(s) employed, the resulting azine mer units may include pendent group(s) that hinder additional chain propagation. In particular, unless all of $R^4$-$R^7$ are very small (i.e., not sterically bulky), and generally only if both $R^4$ and $R^5$ are H and both of $R^6$ and $R^7$ are relatively small (e.g., H, $C_1$-$C_4$, etc.), 1,2-addition tends to occur preferentially and, depending on the size and/or stabilizing characteristics of the $R^6$ and $R^7$ substituents, chain growth can cease.

In situations where 1,4-addition occurs, the result is a moiety as defined by formula (II). Unless both $R^1$ and $R^2$ are H, this reaction renders the technically living (i.e., anionic) polymer chain essentially inactive. While this might be undesirable during the polymerization process, if this incorporation occurs after completion of polymerization but before quenching, the azine radical becomes a terminal moiety thus providing a functionalized polymer.

In situations where 1,2-addition occurs, the result is a moiety as defined by formula (I) where the moiety can be attached to the polymer through one or both of the two open bonds. Where the moiety is attached through both bonds, the moiety constitutes a mer unit; where it is attached through only one bond, the other bond attaches to a hydrogen atom, i.e., the azine radical constitutes a terminal moiety or functional group. In either case, the result can be a functionality, either as a pendent group or a terminal moiety, as defined by formula (III).

Providing an azine radical as a terminal moiety can be a natural result of polymerization (where azine is the first or last mer to incorporate) but, more commonly, it is achieved by functionalizing the polymer prior to quenching, advantageously when it is in the above-described polymer cement state. One method of effecting this functionalization involves introducing to the polymer cement one or more azine compounds and allowing such azine compound(s) to react at a terminus of the polymer.

Reaction of the azine with a pre-made living polymer can be performed relatively quickly (a few minutes to a few hours) at moderate temperatures (e.g., 0° to 75° C.).

Quenching can be conducted by stirring the polymer and an active hydrogen-containing compound, such as an alcohol or acid, for up to about 120 minutes at temperatures of from about 25° to about 150° C.

Solvent can be removed from the quenched polymer cement by conventional techniques such as drum drying, extruder drying, vacuum drying or the like, which may be combined with coagulation with water, alcohol or steam, thermal desolvation, etc.; if coagulation is performed, oven drying may be desirable.

The resulting polymer can be utilized in a tread stock compound or can be blended with any conventionally employed tread stock rubber including natural rubber and/or non-functionalized synthetic rubbers such as, e.g., one or more of homo- and interpolymers that include just polyene-derived mer units (e.g., poly(butadiene), poly(isoprene), and copolymers incorporating butadiene, isoprene, and the like), SBR, butyl rubber, neoprene, EPR, EPDM, acrylonitrile/butadiene rubber (NBR), silicone rubber, fluoroelastomers, ethylene/acrylic rubber, EVA, epichlorohydrin rubbers, chlorinated polyethylene rubbers, chlorosulfonated polyethylene rubbers, hydrogenated nitrile rubber, tetrafluoroethylene/propylene rubber and the like. When a functionalized polymer(s) is blended with conventional rubber(s), the amounts can vary from about 5 to about 99% of the total rubber, with the conventional rubber(s) making up the balance of the total rubber. The minimum amount depends to a significant extent on the degree of hysteresis reduction desired.

Amorphous silica ($SiO_2$) can be utilized as a filler. Silicas are generally classified as wet-process, hydrated silicas because they are produced by a chemical reaction in water, from which they are precipitated as ultrafine, spherical particles. These primary particles strongly associate into aggregates, which in turn combine less strongly into agglomerates. "Highly dispersible silica" is any silica having a very substantial ability to de-agglomerate and to disperse in an elastomeric matrix, which can be observed by thin section microscopy.

Surface area gives a reliable measure of the reinforcing character of different silicas; the Brunauer, Emmet and Teller ("BET") method (described in *J. Am. Chem. Soc.*, vol. 60, p. 309 et seq.) is a recognized method for determining surface area. BET surface area of silicas generally is less than 450 $m^2/g$, and useful ranges of surface include from about 32 to about 400 $m^2/g$, about 100 to about 250 $m^2/g$, and about 150 to about 220 $m^2/g$.

The pH of the silica filler is generally from about 5 to about 7 or slightly over, preferably from about 5.5 to about 6.8.

Some commercially available silicas which may be used include Hi-Sil™ 215, Hi-Sil™ 233, and Hi-Sil™ 190 (PPG Industries, Inc.; Pittsburgh, Pa.). Other suppliers of commercially available silica include Grace Davison (Baltimore, Md.), Degussa Corp. (Parsippany, N.J.), Rhodia Silica Systems (Cranbury, N.J.), and J. M. Huber Corp. (Edison, N.J.).

Silica can be employed in the amount of about 1 to about 100 parts by weight (pbw) per 100 parts of polymer (phr), preferably in an amount from about 5 to about 80 phr. The useful upper range is limited by the high viscosity that such fillers can impart.

Other useful fillers include all forms of carbon black including, but not limited to, furnace black, channel blacks and lamp blacks. More specifically, examples of the carbon blacks include super abrasion furnace blacks, high abrasion furnace blacks, fast extrusion furnace blacks, fine furnace blacks, intermediate super abrasion furnace blacks, semi-reinforcing furnace blacks, medium processing channel blacks, hard processing channel blacks, conducting channel blacks, and acetylene blacks; mixtures of two or more of these can be used. Carbon blacks having a surface area (EMSA) of at least 20 $m^2/g$, preferably at least about 35 $m^2/g$, are preferred; surface area values can be determined by ASTM D-1765 using the CTAB technique. The carbon blacks may be in pelletized form or an unpelletized flocculent mass, although unpelletized carbon black can be preferred for use in certain mixers.

The amount of carbon black can be up to about 50 phr, with about 5 to about 40 phr being typical. When carbon black is used with silica, the amount of silica can be decreased to as low as about 1 phr; as the amount of silica decreases, lesser amounts of the processing aids, plus silane if any, can be employed.

Elastomeric compounds typically are filled to a volume fraction, which is the total volume of filler(s) added divided by the total volume of the elastomeric stock, of about 25%; accordingly, typical (combined) amounts of reinforcing fillers, i.e., silica and carbon black, is about 30 to 100 phr.

When silica is employed as a reinforcing filler, addition of a coupling agent such as a silane is customary so as to ensure good mixing in, and interaction with, the elastomer(s). Generally, the amount of silane that is added ranges between about 4 and 20%, based on the weight of silica filler present in the elastomeric compound.

Coupling agents can have a general formula of A-T-X, in which A represents a functional group capable of bonding physically and/or chemically with a group on the surface of the silica filler (e.g., surface silanol groups); T represents a hydrocarbon group linkage; and X represents a functional group capable of bonding with the elastomer (e.g., via a sulfur-containing linkage). Such coupling agents include organosilanes, in particular polysulfurized alkoxysilanes (see, e.g., U.S. Pat. Nos. 3,873,489, 3,978,103, 3,997,581, 4,002,594, 5,580,919, 5,583,245, 5,663,396, 5,684,171, 5,684,172, 5,696,197, etc.) or polyorganosiloxanes bearing the X and A functionalities mentioned above. An exemplary coupling agent is bis[3-(triethoxysilyl)propyl]-tetrasulfide.

Addition of a processing aid can be used to reduce the amount of silane employed. See, e.g., U.S. Pat. No. 6,525,118 for a description of fatty acid esters of sugars used as processing aids. Additional fillers useful as processing aids include, but are not limited to, mineral fillers, such as clay (hydrous aluminum silicate), talc (hydrous magnesium silicate), and mica as well as non-mineral fillers such as urea and sodium sulfate. Preferred micas contain principally alumina, silica and potash, although other variants are also useful, as set forth below. The additional fillers can be utilized in an amount of up to about 40 phr, typically up to about 20 phr.

Other conventional rubber additives also can be added. These include, for example, process oils, plasticizers, antidegradants such as antioxidants and antiozonants, curing agents and the like.

All of the ingredients can be mixed using standard equipment such as, e.g., Banbury or Brabender mixers. Typically, mixing occurs in two or more stages. During the first stage (often referred to as the masterbatch stage), mixing typically is begun at temperatures of ~120° to ~130° C. and increases until a so-called drop temperature, typically ~165° C., is reached.

Where a formulation includes silica, a separate re-mill stage often is employed for separate addition of the silane component(s). This stage often is performed at temperatures similar to, although often slightly lower than, those employed in the masterbatch stage, i.e., ramping from ~90° C. to a drop temperature of ~150° C.

Reinforced rubber compounds conventionally are cured with about 0.2 to about 5 phr of one or more known vulcanizing agents such as, for example, sulfur or peroxide-based curing systems. For a general disclosure of suitable vulcanizing agents, the interested reader is directed to an overview such as that provided in Kirk-Othmer, *Encyclopedia of Chem. Tech.*, 3d ed., (Wiley Interscience, New York, 1982), vol. 20, pp. 365-468. Vulcanizing agents, accelerators, etc., are added at a final mixing stage. To ensure that onset of vulcanization does not occur prematurely, this mixing step often is done at lower temperatures, e.g., starting at ~60° to ~65° C. and not going higher than ~105° to ~110° C.

The following non-limiting, illustrative examples provide the reader with detailed conditions and materials that can be useful in the practice of the present invention.

EXAMPLES

In the examples, dried glass vessels previously sealed with extracted septum liners and perforated crown caps under a positive $N_2$ purge were used for all preparations. Butadiene (22.3% in hexane), styrene (33% in hexane), hexane, n-butyllithium (1.60 M in hexane), oligomeric oxolanyl propanes (1.6 M solution in hexane, stored over $CaH_2$), and butylated hydroxytoluene (BHT) solution in hexane were used.

Commercially available reagents and starting materials included the following, all of which were acquired from Sigma-Aldrich Co. (St. Louis, Mo.) and used without further purification unless otherwise noted in a specific example: cyclohexanecarboxaldehyde (98% purity), 2-pyridinecarboxaldehyde (99% purity), N-methyl-2-pyrrolecarboxaldehyde (98% purity), hydrazine (98% purity), pyridine (99% purity), acetone azine (98%), and trans,trans-benzaldehyde azine (99% purity).

In addition to the purchased trans,trans-benzaldehyde azine, three additional azine compounds were prepared by reacting at room temperature 60 mmol hydrazine with 120 mmol of, respectively, cyclohexanecarboxaldehyde, 2-pyridinecarboxaldehyde and N-methyl-2-pyrrolecarboxaldehyde, each in 100 mL pyridine and each for ~12 hours. Each resulting azine was isolated and purified using the following sequence: vacuum distillation to remove pyridine, dilution with diethyl ether, washing with water, drying (of the organic phase) over $MgSO_4$, evaporation to dryness, and subjecting the product to silica gel column chromatography using an appropriate mixture of ethyl acetate and hexane as eluent. Yield for each was greater than 90%.

Testing data in the Examples was performed on filled compositions made according to the formulation shown in Table 2, a carbon black only formulation. In these tables, N-phenyl- N'-(1,3-dimethylbutyl)-p-phenyldiamine acts as an antioxidant while benzothiazyl-2-cyclohexylsulfenamide and N,N'-diphenyl guanidine act as accelerators.

TABLE 2

Compound formulation, carbon black only

| | Amount (phr) |
|---|---|
| Masterbatch | |
| polymer | 100 |
| carbon black (N343 type) | 55 |
| wax | 1 |
| N-phenyl-N'-(1,3-dimethylbutyl)-p-phenyldiamine | 0.95 |
| ZnO | 2.5 |
| stearic acid | 2 |
| aromatic processing oil | 10 |
| Final | |
| sulfur | 1.3 |
| benzothiazyl-2-cyclohexylsulfenamide | 1.7 |
| N,N'-diphenyl guanidine | 0.2 |
| TOTAL | 174.65 |

Data corresponding to "50° C. Dynastat tan δ" were acquired from tests conducted on a Dynastat™ mechanical spectrometer (Dynastatics Instruments Corp.; Albany, N.Y.) using the following conditions: 1 Hz, 2 kg static mass and 1.25 kg dynamic load, a cylindrical (9.5 mm diameter×16 mm height) vulcanized rubber sample, and 50° C.

Data corresponding to "Dispersion index" (DI) were calculated using the equation $$DI = 100 - \exp[A \times \log_{10}(F^2 H) + B]$$

where F is the number of roughness peaks/cm, H is the average roughness peak height, and A and B are constants from Method B in ASTM-D 2663-89. The F and H contour data were acquired by analyzing cut samples (~3.5×2×0.2 cm) with a Surfanalyzer™ profilometer (Mahr Federal Inc.; Providence, R.I.), using the procedure described in Method C (from ASTM-D 2663-89).

Data corresponding to "Bound rubber" were determined using the procedure described by J. J. Brennan et al., *Rubber Chem. and Tech.*, 40, 817 (1967).

Examples 1-5

To a $N_2$-purged reactor equipped with a stirrer was added 1.63 kg hexane, 0.41 kg styrene solution, and 2.44 kg butadiene solution. The reactor was charged with 3.60 mL n-butyllithium, followed by 1.05 mL of oligomeric oxolanyl propanes solution. The reactor jacket was heated to 50° C. and, after ~28 minutes, the batch temperature peaked at ~65° C.

After an additional ~30 minutes, polymer cement was transferred from the reactor to dried glass vessels. A control (sample 1) was quenched with isopropanol.

Four samples were terminated (50° C. bath for ~30 minutes) with, respectively, 0.46 mL (1.0 M in toluene) trans, trans-benzaldehyde azine (sample 2), 0.46 mL (1.0 M in toluene) cyclohexanecarboxaldehyde azine (sample 3), 0.92 mL (0.5 M in a 1:1 mixture of toluene and THF) N-methyl-2-pyrrolecarboxaldehyde azine (sample 4), and 2.3 mL (0.2 M in chlorobenzene) 2-pyridinecarboxaldehyde azine (sample 5).

These and the control (sample 1) were coagulated in isopropanol containing BHT and drum dried.

Using the formulation from Table 2 above, vulcanizable elastomeric compounds containing reinforcing fillers were prepared from samples 1-5. Results of physical testing on these compounds are shown below in Table 3.

TABLE 3

Testing data from Examples 1-5

| | 1 | 2 | 3 | 4 | 5 |
|---|---|---|---|---|---|
| $M_n$ (kg/mol) | 117 | 131 | 118 | 144 | 81* |
| $M_w/M_n$ | 1.05 | 1.16 | 1.05 | 1.20 | 1.44 |
| % coupling | 0 | 19.4 | 2.7 | 28.7 | 62.6 |
| $T_g$ (° C.) | −37.3 | −36.9 | −36.9 | −36.8 | −37.2 |
| Dispersion index | 94.1 | 94.9 | 96.6 | 96.8 | 96.2 |
| Bound rubber (%) | 13.7 | 34.2 | 25.8 | 30.8 | 27.9 |
| 171° C. MDR $t_{50}$ (min) | 2.75 | 2.85 | 2.72 | 2.67 | 2.61 |
| 171° C. MH-ML (kg-cm) | 19.3 | 16.7 | 18.3 | 17.9 | 18.3 |
| $ML_{1+4}$ @ 130° C. | 26.2 | 41.7 | 33.0 | 40.1 | 42.8 |
| 300% modulus @ 23° C. (MPa) | 11.42 | 14.03 | 12.86 | 13.25 | 13.04 |
| Tensile strength @ 23° C. (MPa) | 14.57 | 19.00 | 18.14 | 18.77 | 18.59 |
| Temp. sweep 0° C. tan δ | 0.199 | 0.226 | 0.211 | 0.212 | 0.209 |
| Temp. sweep 50° C. tan δ | 0.251 | 0.189 | 0.217 | 0.211 | 0.204 |
| RDA 0.25-14% ΔG' (MPa) | 4.468 | 1.270 | 1.888 | 1.473 | 1.034 |
| 50° C. RDA strain sweep (5% strain) tan δ | 0.2366 | 0.1434 | 0.1741 | 0.1498 | 0.1342 |
| 50° C. Dynastat tan δ | 0.2254 | 0.1452 | 0.1687 | 0.1492 | 0.1288 |

*The $M_n$ of the polymer of sample 5 probably appears artificially low due to interaction of the 2-pyridinecarboxaldehyde azine functionality with the GPC column packing material.

From the 50° C. strain sweep data of Table 3, one can see that styrene/butadiene interpolymers having terminal units with a —N=$CR^8$ pendent group provide, compared to a control polymer, significant reductions (on the order of 25-45%) in tan δ.

That which is claimed is:

1. A method of providing a terminally functionalized polymer comprising reacting a carbanionic polymer and an aldehyde azine compound selected from benzaldehyde propanal azine, cyclopentanecarboxaldehyde butanal azine, cyclohexane-carboxaldehyde octanal azine, cyclononanecarboxaldehyde heptanal azine, 2-pyridine-carboxaldehyde azine, tetrahydrofuran-3-carboxaldehyde azine, 3-furancarboxaldehyde azine, N-methyl-4-pyrazolecarboxaldehyde azine, N-methyl-2-pyrrolecarboxaldehyde azine, N-methyl-2-imidazolecarboxaldehyde azine, N-methyl-indole-3-carboxaldehyde azine, N-methyl-1,2,3-triazole-4-carboxaldehyde azine, N-methyl-1,2,4-triazineole-3-carboxaldehyde azine, 2-furancarboxaldehyde azine, pryazinecarboxaldehyde azine, 2-thiazolecarboxaldehyde azine, and 2-thiophenecarboxaldehyde azine.

2. The method of claim 1 wherein said carbanionic polymer comprises directly bonded aromatic pendent groups.

3. The method of claim 2 wherein said directly bonded aromatic pendent groups are present in from about 20 to about 35% by weight of said carbanionic polymer mer.

4. The method of claim 1 wherein said aldehyde azine compound is 2-pryidinecarboxaldehyde azine.

5. The method of claim 1 wherein said aldehyde azine compound is N-methyl-2-pyrrolecarboxaldehyde azine.

6. The method of claim 1 further comprising blending said functionalized polymer with at least one type of particulate filler and, optionally, at least one additional polymer so as to form a reinforced rubber compound.

7. The method of claim 6 further comprising vulcanizing said reinforced rubber compound so as to form a rubber article.

8. The method of claim 2 wherein said carbonionic polymer further comprises polyene mer.

9. The method of claim 8 wherein said carbanionic polymer has random microstructure.

10. The method of claim 8 wherein said carbanionic polymer has an overall 1,2-microstructure, based on total polyene mer content, of no more than about 50%.

11. A method of providing a terminally functionalized polymer comprising reacting a carbanionic polymer and a ketone azine selected from cyclobutanone azine, cyclopentanone azine, cyclohexanone azine, cycloheptanone azine, cyclooctanone azine cyclononanone azine, cyclodecanone azine, cycloundecanone azine, cyclododecanone azine, cyclotridecanone azine, 2-acetylthiazole azine, 2-acetylpyridine azine, 3-acetylpyridine azine, 4-acetylpyridine azine, bis(2-pyridyl)keytone azine, 2-acetyl-1-methyl-pyrrole azine, and 3-acetyl-1-methylpyrrole azine.

12. The method of claim 11 wherein said carbanionic polymer comprises directly bonded aromatic pendent groups.

13. The method of claim 12 wherein said directly bonded aromatic pendent groups are present in from about 20 to about 35% by weight of said carbanionic polymer mer.

14. The method of claim 12 wherein said carbanionic polymer further comprises polyene mer.

15. The method of claim 14 wherein said carbanionic polymer has random microstructure.

16. The method of claim 14 wherein said carbanionic polymer has an overall 1,2-microstructure, based on total polyene mer content, of no more than about 50%.

17. The method of claim 11 further comprising blending said functionalized polymer with at least one type of particulate filler and, optionally, at least one additional polymer so as to form a reinforced rubber compound.

18. The method of claim 17 further comprising vulcanizing said reinforced rubber compound so as to form a rubber article.

19. The method of claim 11 wherein said ketone azine is selected from 2-acetylthiazole azine, 2-acetylpyridine azine, 3-acetylpyridine azine, 4-acetylpyridine azine, bis(2-pyridyl)ketone azine, 2-acetyl-1-methylpyrrole azine, and 3-acetyle-1-methylpyrrole azine.

* * * * *

UNITED STATES PATENT AND TRADEMARK OFFICE
CERTIFICATE OF CORRECTION

PATENT NO. : 8,183,326 B2  
APPLICATION NO. : 11/880733  
DATED : May 22, 2012  
INVENTOR(S) : Yan et al.

Page 1 of 1

It is certified that error appears in the above-identified patent and that said Letters Patent is hereby corrected as shown below:

In column 13, line 1, delete "pryazinecarboxaldehyde" and insert -- pyrazinecarboxaldehyde --.

In column 14, line 4, delete "keytone" and insert -- ketone --.

In column 14, lines 28-29, delete "3-acetyle-1-methylpyrrole" and insert -- 3-acetyl-1-methylpyrrole --.

Signed and Sealed this
Twenty-seventh Day of November, 2012

David J. Kappos
*Director of the United States Patent and Trademark Office*